(12) United States Patent
Kelwaski

(10) Patent No.: US 6,765,776 B2
(45) Date of Patent: Jul. 20, 2004

(54) CONFIGURABLE INTERRUPTER FOR CIRCUIT OVERCURRENT CONDITIONS

(75) Inventor: H. Edward Kelwaski, Craigville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 406 days.

(21) Appl. No.: 10/020,828

(22) Filed: Dec. 12, 2001

(65) Prior Publication Data
US 2003/0107863 A1 Jun. 12, 2003

(51) Int. Cl.$^7$ ................................................ H02H 3/00
(52) U.S. Cl. .................. 361/93.9; 361/18; 361/100; 361/103
(58) Field of Search ............................... 361/93.9, 93.1, 361/100, 115, 62, 64, 66, 58, 18, 103; 307/10.1

(56) References Cited

U.S. PATENT DOCUMENTS

| | | | |
|---|---|---|---|
| 4,799,126 A | 1/1989 | Kruse et al. | ................. 361/101 |
| 4,967,304 A | * 10/1990 | Dougherty | .................... 361/31 |
| 5,585,663 A | 12/1996 | Bezama et al. | ............. 257/529 |
| 5,622,892 A | 4/1997 | Bezama et al. | ............. 438/601 |
| 5,723,915 A | * 3/1998 | Maher et al. | ................ 307/131 |
| 5,856,711 A | 1/1999 | Kato et al. | ................. 307/10.6 |
| 6,125,024 A | * 9/2000 | LeComte et al. | ........... 361/104 |

* cited by examiner

Primary Examiner—Stephen W. Jackson
(74) Attorney, Agent, or Firm—Jeffrey P. Calfa; Dennis Kelly Sullivan; Susan L. Lukasik

(57) ABSTRACT

Electrical power distribution circuits for motor vehicles incorporate a switching element for controlling the energization of the circuits. Current metering elements associated with each switching element indicate the current drawn by the respective electrical circuits. A microcontroller is provided which provides an activation signal for the switching elements, often in accord with a pulse width modulated duty cycle. The microcontroller implements a circuit protective algorithm which takes as inputs the indication of current drawn by a particular electrical circuit and the duty cycle. An equivalent D.C. current is estimated for determining a heat index for a hypothetical fuse suitable for protecting the circuit. When the heat index exceeds the rating for the fuse the fuse melts.

15 Claims, 6 Drawing Sheets

CONFIGURABLE INTERRUPTER FOR CIRCUIT OVERCURRENT CONDITIONS

BACKGROUND OF THE INVENTION

1. Field of the Invention

The present invention relates to motor vehicle electrical systems and more particularly to a programmable system protecting such electrical systems from overcurrent conditions.

2. Description of the Problem

The number of electrical circuits in automotive vehicles has increased over the years. In today's motor vehicles there are numerous electrical devices which are used for various purposes such as illumination, control, power, and instrumentation. While the advent of electronics has given rise to major changes in automotive electrical systems, conventional circuit protection devices, e.g. fuses and circuit breakers, continue to be used, and in increasing numbers as the number of circuits in the electrical systems increases. The common technique for providing protection against shorts, overloads, and other types of electrical problems or conditions is to include a circuit breaker or fuse connected in series, with the wiring circuit to be protected.

With increasing numbers of circuits, and the correlative need for an increased number of protective devices, today's typical automotive vehicle or truck requires a panel devoted essentially exclusively to the mounting of most of these protective devices in a single location. The panel, or fuse block as it is sometimes called, comprises multiple compartments for the individual protective devices. Associated with these compartments are receptacles to provide for the replaceable mounting of the protective devices in the associated circuits. Accordingly, the panel comprises a large number of individual parts in assembled relationship, and it occupies a certain amount of space in an area of the vehicle where space is typically at a premium. A large number of wires attach to the panel to carry current to and from the various protective devices, and in order to serve the grouping of the protective devices in the panel, complexities are introduced into the associated wiring harnesses and cost is added to the vehicle. In addition, the variability of commercial vehicles may result in different valued fuses or circuit breakers being installed at the same physical location on different vehicles of the same model truck, resulting in assembly errors.

There are several ways to protect an electrical device without a circuit breaker or fuse, but most of the ways add several parts to the circuit and typically degrade the performance of the electrical circuit, such as by added voltage drop, higher power dissipation, etc. These protection methods are not known to enjoy any significant commercial use because of disadvantages such as those just mentioned. Providing a substitute device for a fuse can pose other complications. Devices for interrupting a circuit based on detection of a simple overcurrent condition do not mimic fuse behavior, which is characterized by opening after passage of an overcurrent of a sufficient time duration to cause the fusible element to melt. Fuses thus tolerate transient, non fault related, overcurrent conditions, sometimes greatly exceeding the rated tolerance of the fuse, such as occur when a lamp is turned on. Fuses also tolerate other types of brief overcurrent excursions such as peaks occurring in alternating current circuits, where the root mean square value for the current remains below the direct current rating for the fuse. It is often desirable to use fuses in circuits for just this feature.

U.S. Pat. No. 4,799,126 to Kruse, et al., which is assigned to the assignee of the present invention, recognized that the fuse and circuit breaker panel concept of protection could be eliminated, thereby reducing the large number of individual circuit devices (i.e., fuses and circuit breakers) required to provide the protective function, and at the same time, freeing space because there is no longer a need for a separate panel. The circuit breaker function is provided by using a particular type of power MOSFETs, which also serve for circuit switching. MOSFETs comprise an internal, controlled conduction path the conductivity of which is controlled by an external control input. The type of MOSFET used by Kruse comes with built in protection, contained in another internal portion which monitors current flow through the main controlled conduction path and serves to internally interrupt the flow through the path in response to incipiency of current or temperature exceeding the rating of the main controlled conduction path. When one of these MOSFETs is incorporated into a circuit, it is selected on the basis of a close match in the amount of current to be allowed to be drawn by a circuit and the tolerances of the MOSFET. This final aspect of Kruse's teaching necessitated manufacturing vehicles using MOSFETs of a number of different capacities.

Kato et al., U.S. Pat. No. 5,856,711 provides a circuit interrupt device capable of being set for different current-time characteristics without physical modification of the device itself. In addition, Kato appears to provide a device which mimics the time delay in breaking inherent to fuses operating under overcurrent conditions. Kato teaches switches (relays) having a control input; current detection functionality; and a load drive line for connection to loads to which electric power is supplied from a battery. A device controller includes data processing capacity and memory, on which is stored the desired current/breaking time characteristics data. The device controller opens a switch by supplying a control input signal to the switch when the breaking time in the memory has elapsed. This is effected by starting a timer immediately after detection of an overcurrent condition and running it against a time out threshold stored in memory for the value of the current. Memory is programmable for the desired time-current values. The '711 patent does not appear to vary the breaking time period for changes in current once a timer has been started. Thus, so long as an overcurrent condition continues to exist, the timer continues to run against the initial time out period matched with the initially detected overcurrent condition. The timer stops only if current falls below a minimum threshold level. This aspect of Kato's control algorithm presents difficulties in applying the system to circuits other than those designed for use with clean direct current loads. Kato et al. do not address these problems.

Power MOSFETs are popular switching devices in contemporary vehicle electronics. Among other applications, power MOSFETS can be used to implement pulse width modulation (PWM) switching, which allows precise control over vehicle features such as varying the illumination level of running lights and changing the operating speed of electric motors to change the sweep speed of windshield wipers. PWM is, in effect, an alternating current signal with a direct current offset, or unipolarity A.C. In PWM switching systems, peak values in current drawn may vary, for example changing with the changing load associated with windshield motor operation under conditions windshield icing. Circuit protection devices used with such systems, in order to be effective, must operate accurately in such a quasi or unipolarity alternating current (A.C.) environment. Peak pulse current values may safely exceed the current rating for the circuit without being symptomatic of a dangerous condition or indicative of a short, so long as the root mean square (RMS) value of the current remains below the maximum current rating. Conversely, current drawn may be excessive, but a system such as proposed by Kato et al. would miss detection of it because the duty cycle is to short for the timer to expire.

The Kruse et al. and Kato et al. patents do not address environments where the circuit current has A.C. components, but instead appear limited to D.C. applications. Kato et al. apply data processing capacity to the determination of when to trip a relay in response to excessive current being drawn by a circuit. Though the algorithm employed by Kato et al. appears tolerant of transient overcurrent situations, it does explicitly deal with quasi A.C. conditions.

In addition, MOSFET devices require protection. During high levels of overload, any field effect transistor (FET) will be rapidly heated and cooled as temperature protection mechanisms of the FET limit the power dissipated in the FET. Over time, such heating and cooling of the FET reduce the useful life of the device, an effect known as the Coffin-Manson acceleration.

It would be advantageous in vehicle manufacture to dispense with fuses for circuit protection and implement circuit overcurrent protection directly in the switches used to control the circuits. It would be still more advantageous if the switches were standardized and if implementation of their response characteristics could be introduced to the vehicle by programming. Such a feature would simplify manufacture and repair. It would be still more advantageous if the devices could be programmed to handle a wide variety of different operating conditions, including unipolarity A.C. operation.

SUMMARY OF THE INVENTION

According to the invention there is provided a motor vehicle comprising electrical power distribution circuits. Switching elements are incorporated in the electrical circuits for controlling the energization thereof. Current metering elements associated with each switching element indicate the current drawn by the respective electrical circuits. A microcontroller is provided which provides an activation signal for the switching elements, often in accord with a pulse width modulated duty cycle. The microcontroller implements a circuit protective algorithm which takes as inputs the indication of current drawn by a particular electrical circuit and the duty cycle. An equivalent D.C. current is developed for determining a heat index for a hypothetical fuse suitable for protecting the circuit. When the accumulated heat index exceeds the heat index rating for the hypothetical fuse the circuit is opened.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
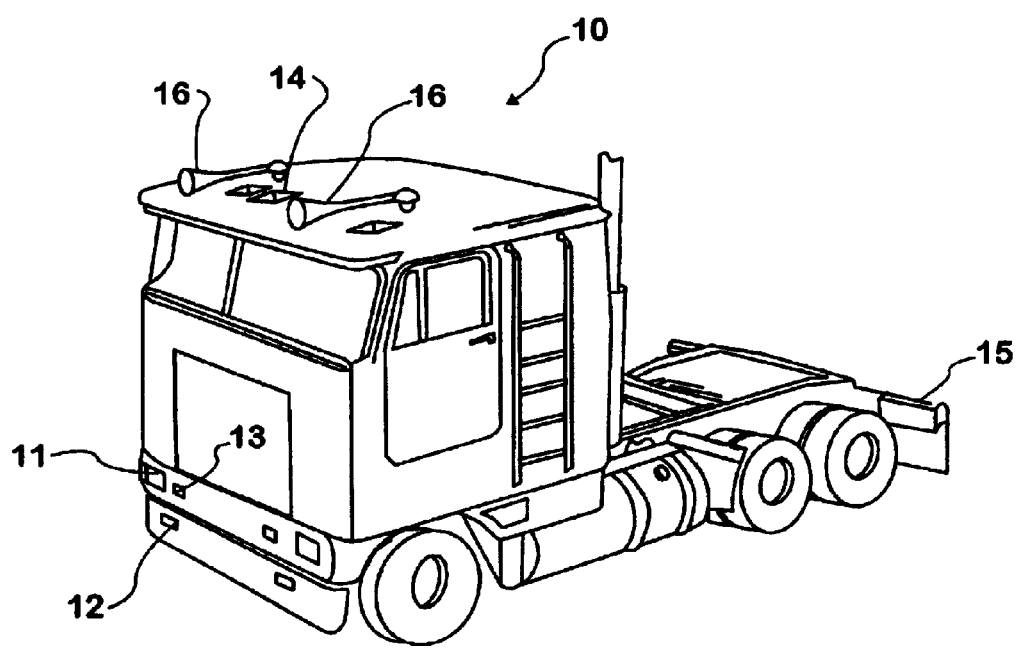
FIG. 1 is a perspective view of a truck including features energized by electrical power such as lamps and horns.

FIG. 1 is a perspective view of a truck tractor 10. Tractor 10 includes the conventional major systems of a vehicle, including an engine, a starter system for the engine, brakes, and a transmission. Tractor 10 also includes a number of electrical systems including interior and exterior lamps by which the vehicle provides light for its driver to see by and means to be seen, particularly at night, by others. On the front of tractor 10 are headlights 11, front corner turn signal lamps 13, and fog lamps 12. Identification or running lights 14 are installed on the roof of tractor 10. A lamp box 15 installed on the rear end of tractor 10 carries additional turn signal lights, reverse lights and brake lights. As is common, the forward and tail end turn signal lights have a hazard function and can be cycled on and off together (generally the forward pair together and then the tail end pair together) to provide warning to passing motorists. A pair of electrically activated horns 16 are installed on the roof of tractor 10. The protection of circuits used to energize the lamps and horns, among other devices, is achieved as described below.

Figure 2:
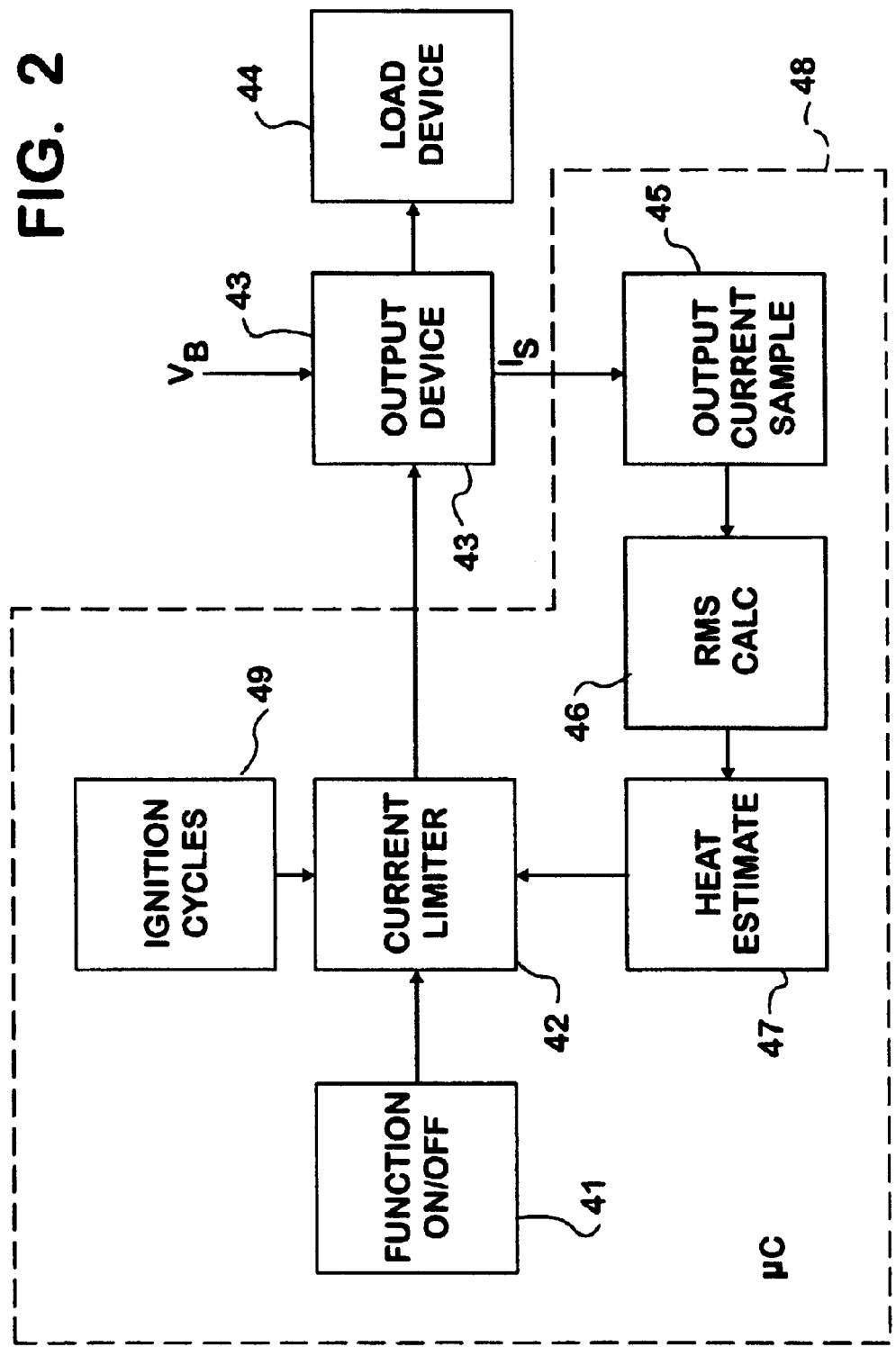
FIG. 2 is a high level block diagram illustrating operation of the invention.

FIG. 2 a functional block diagram overview of the invention implemented on a microcontroller 48. Those skilled in the art will recognize that the functions grouped within microcontroller 48, such as data processing, data storage and gate control signal generation, may be associated with one another in some other fashion, for example, by controllers interacting over a network. A switching output device 43, preferably comprising an FET having known over temperature shut down characteristics and which produces an analog representation of a load current passing through the device provides direct control over a load 44. While output device 43 is preferably a power MOSFET, it can also be a bi-polar transistor, a relay, or some other equivalent device, with some loss of functionality, as such other switching elements may not inherently provide a secondary output proportional to the load current drawn through the device. Microcontroller 48 provides an ON/OFF binary output for controlling the conduction of output device 43 and an analog input 45 for taking as an input the secondary output reflecting load current through the FET. Output device 43 is connected by its drain to a source of power VB and at its source to a load device 44. Microcontroller 48 is conventional and includes a central processing unit and memory for storing permanent and temporary data, including programs. Here the microcontroller 48 is illustrated as relating its functional blocks to one another as they interact to provide control of the output device 43. Load device 44 has a function which is normally turned on and off in accordance with instructions issued by a function block 41. The function may include cycling output device 43 on and off in accordance with PWM control of the load device 44. Absent overcurrent or overheating conditions, the control signal from function ON/OFF block 41 is passed by current limiter 42 to output device 43 as a gate signal. Load device 44 can be any one of a number of vehicle systems. One system where the invention is advantageously employed is with system lights the illumination levels of which are controlled by varying the duration of pulses in a PWM control scheme.

Output device 43, when implemented in a MOSFET can incorporate, as an inherent function, means to produce an output current sense signal which is proportional to the load current drawn by load device 44 and the energization circuit in which load device 44 is connected. An output current block 45 takes this output current sense signal, $I_S$, and converts it a digital signal to provide as an input to a root mean square calculation function 46. RMS calculator 46 also takes as an input the basic ON/OFF signal from the function block, or, equivalently, the duty cycle of the output, and uses the two inputs to determine the RMS value of the output. In a typical PWM application this involves sampling $I_S$ when the output device 43 is conducting (in effect sampling the peak value each cycle), averaging the samples and multiplying the result by the fraction of the time that the output device 43 is conducting to develop an estimate of the RMS equivalent current. It is not strictly necessary to determine the exact RMS equivalent as long as the algorithm used produces a result falls within published tolerances for appropriate fuses for the application.

RMS calculator 46 provides an RMS estimate for load current to a heat estimator block 47, which in turn determines if a hypothetical fuse would be progressing toward melting. If the RMS current is to high, than points are added to a running total which, if it exceeds a threshold, indicates an appropriate time for a fuse opening event. If the RMS current is below a selected minimum threshold (typically 110% of the rating for a fuse for the circuit) the running total is reduced. Once an accumulated count exceeds a desired level heat estimator overrides function block 41 and causes current limiter to apply a gate signal to the output device 43 opening the device.

To reduce the effects of Coffin-Manson acceleration, simple counting methods limit the number of thermal cycles impressed on the power MOSFETs. An ignition cycles block 49 is tied to current limiter 42 and allows non-safety devices only one fuse event per ignition cycle. Safety related systems can be allowed multiple fusing events per ignition cycle. This arrangement can be varied on a vehicle by vehicle basis by programming. Other schemes can be used if the criticality of a particular system changes. Appropriate flags may be set upon starting a vehicle to implement this feature.

The time to opening characteristics programmed for MOSFET switches are set to fall within normal tolerances of standard fuses. The Society of Automotive Engineers has published test limits on the current/time functionality of fuses for vehicular use. The present invention implements an algorithm designed to produce results falling within the tolerances for particular fuses, as illustrated in FIG. 3.

Figure 3:
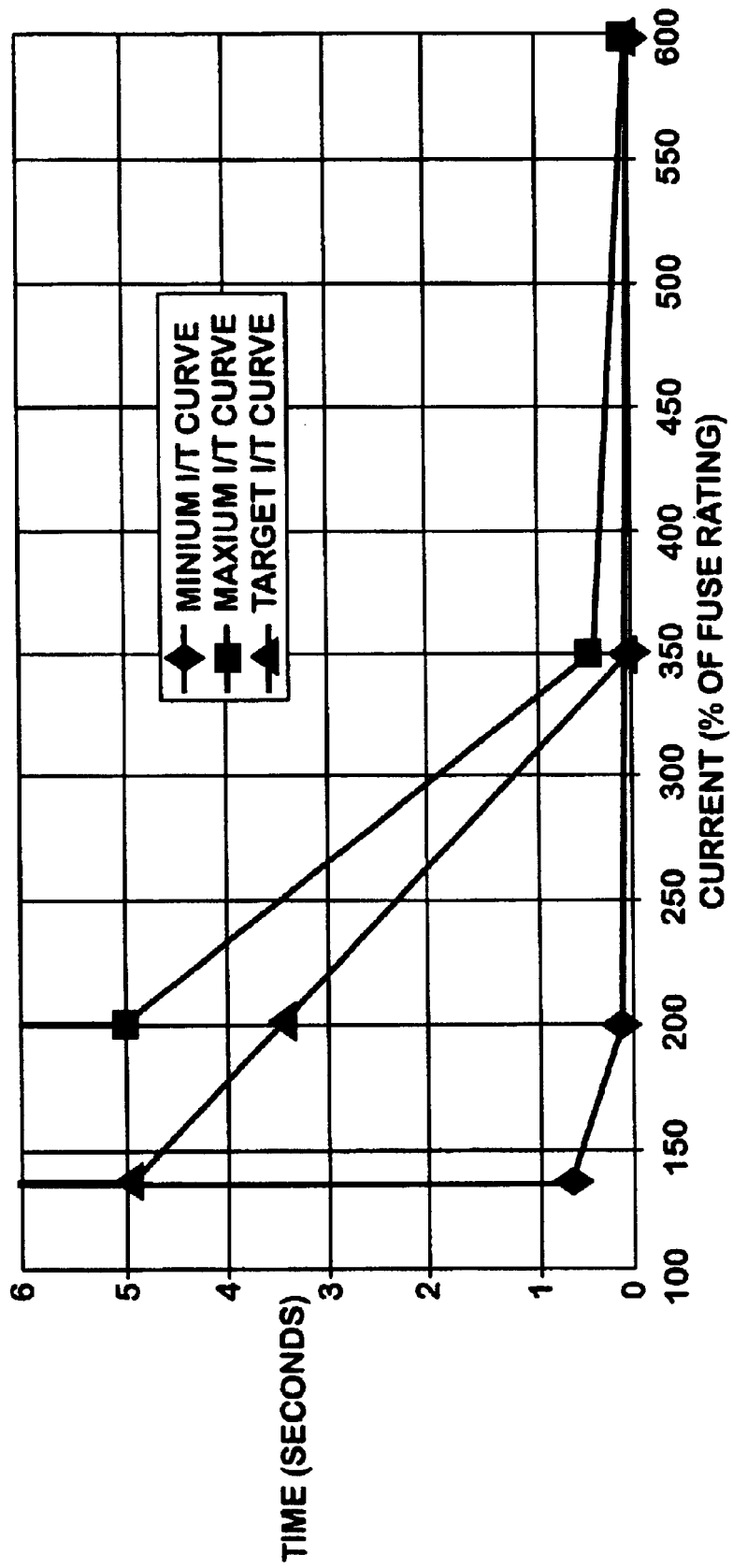
FIG. 3 is a graph illustrating typical tolerances for an automotive fuse in terms of current versus time.

FIG. 3 is a graph illustrating tolerances for times to melt for a fuse for a given application as a function of D.C. equivalent current. The Society of Automotive Engineers publishes recommended fuse operating characteristics in terms of minimum and maximum recommended times to melting at various percentages of rated current. A fuse carrying the equivalent of 100% of its rated current should never melt. A fuse should tolerate up to at least 110% of its rated value. At most, such a fuse should tolerate 200% of its rated value. Actual fuse times versus current fits between the recommended minimum and maximum melting time curves. In the present invention the operation of the switching element is to be similar to that of an automatic reset circuit breaker. The switch can be returned to operation by using an algorithm that allows the conductors sufficient time to cool during the non-conductive periods. The cooling time required depends upon the starting temperature of the switch, and the device programmed on the basis of empirical testing on representative circuits.

Figure 4:
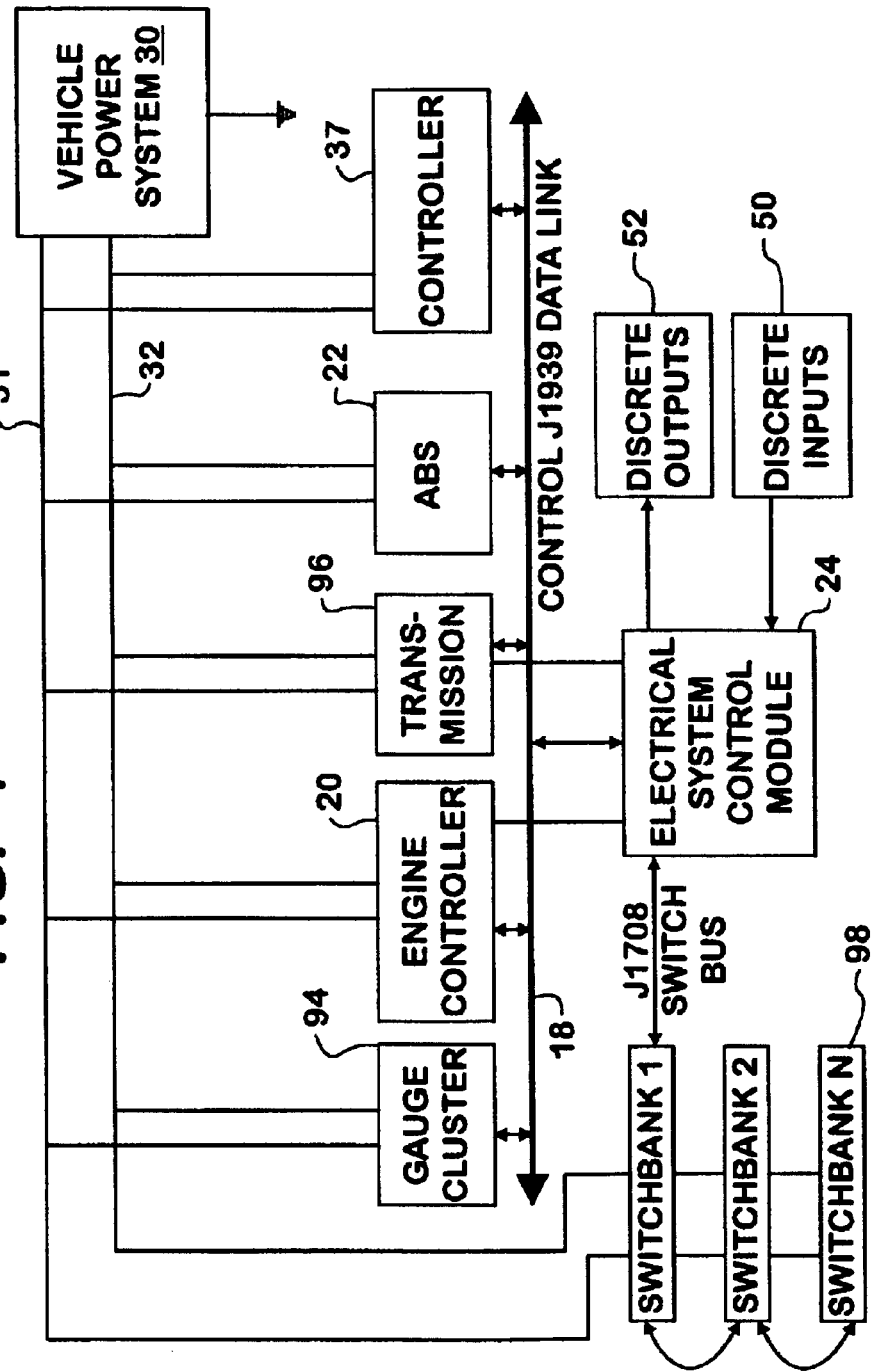
FIG. 4 is a block diagram of a vehicle control and power system environment wherein the invention is applied.

A preferred embodiment of the invention will now be described in connection with FIGS. 4–6. FIG. 4 illustrates schematically electronic control and electrical power distribution system for vehicle 11. Electronic System Controller (ESC) 24 is a body controller computer which communicates with several autonomous controllers over a SAE J1939 data link 18, including a gauge cluster 94, a transmission controller 96, an antilock brake system controller 22 and an engine controller 20. One or more other controllers 37 may be attached to the bus 18. Each controller includes data processing capability allowing programming and functional control to be distributed across the network. Each of these local autonomous controllers may in turn receive data directly from switches and sensors, as ESC 24 does from a switch bank 48 and discrete input section 50. Discrete inputs may include ignition key switch position and start button position. Each local controller may provide control or informational signals to local discretely controllable components, as ESC 24 does with discrete output section 52. Vehicle power system 30 includes batteries and the alternator system, and distributes unipolarity power over a power cable 31 to each of the major vehicle systems. Line 32 is chassis ground.

Figure 5:
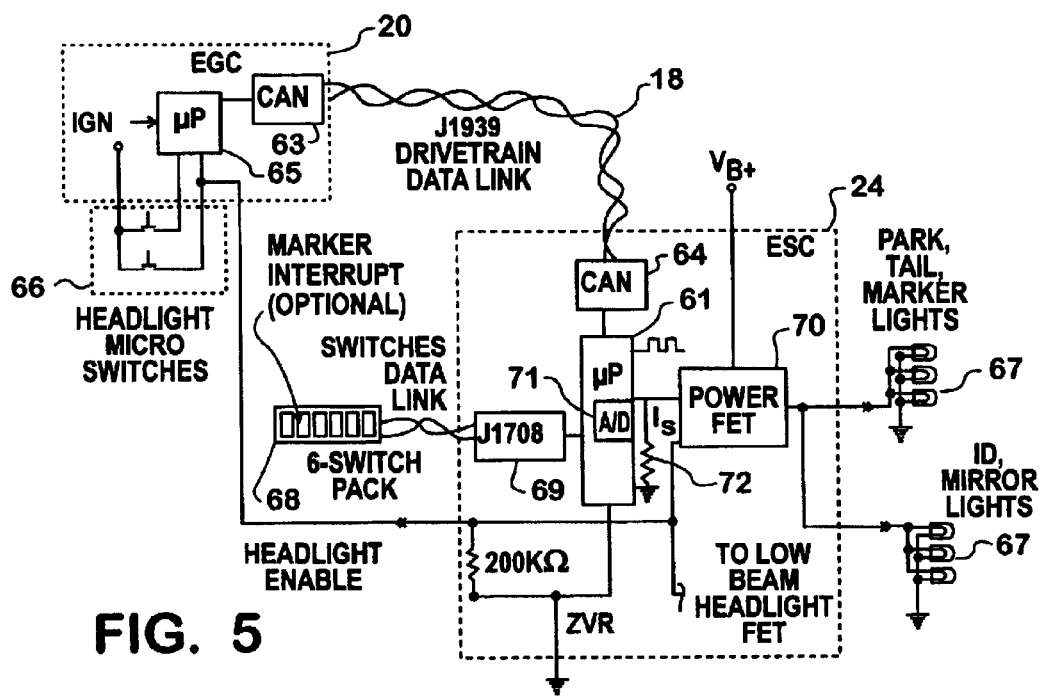
FIG. 5 is a detailed schematic of a lighting circuit illustrating a preferred embodiment of the present circuit protection system.

FIG. 5 is a circuit schematic of a engine controller EGC 20 which receives operator requests for illumination of headlamps, ESC 24, and a plurality of lamps energized under the control of the ESC. Headlamp requests are routed through the engine controller 20 because it is required that the ignition be on before use of the headlamps is permitted. ESC 24 is a programmable body systems computer used to control many vehicle electrical system functions, and the functions it performs relating to lamp control could readily be distributed to lower functionality microcontrollers. Typically, however, the operation of lamps is handled by ESC 24. ESC 24 is based on a microprocessor 61 which executes programs and which controls switching of a plurality of power FETs used to actuate vehicle exterior lights and the horn. EGC 20 communicates with ESC 24 over an SAE J1939 data link (bus 18) and CAN controllers 63 and 64. EGC 20 is based on a microprocessor 65 which includes only limited and typically fixed programming. EGC 20 handles lamp microswitch 66 inputs providing manual control over headlights and enablement of the headlamps. Another source of switch inputs may by provided by a switch pack 68 which is connected to microprocessor over an SAE J1708 bus and controller 69 or through switches associated with brake pedals, turn signal levers and other similar systems. Illumination levels of the lamps 67 may be selected using switch pack 68.

Microprocessor 61 can apply activation signals to a Power FET 70 for the control of lamps 67. Microprocessor 61 is connected to provide an activation signal to the gate of a power FET 70 which in turn energizes the lamps 67. The gate signal may be pulse width modulated to control illumination intensity. Microprocessor is further connected to power FET 70 to receive a output current sense signal $I_S$, which is applied across a resistor 72 to produce a voltage signal which is applied to an A/D converter port 71 on microprocessor 61.

Figure 6:
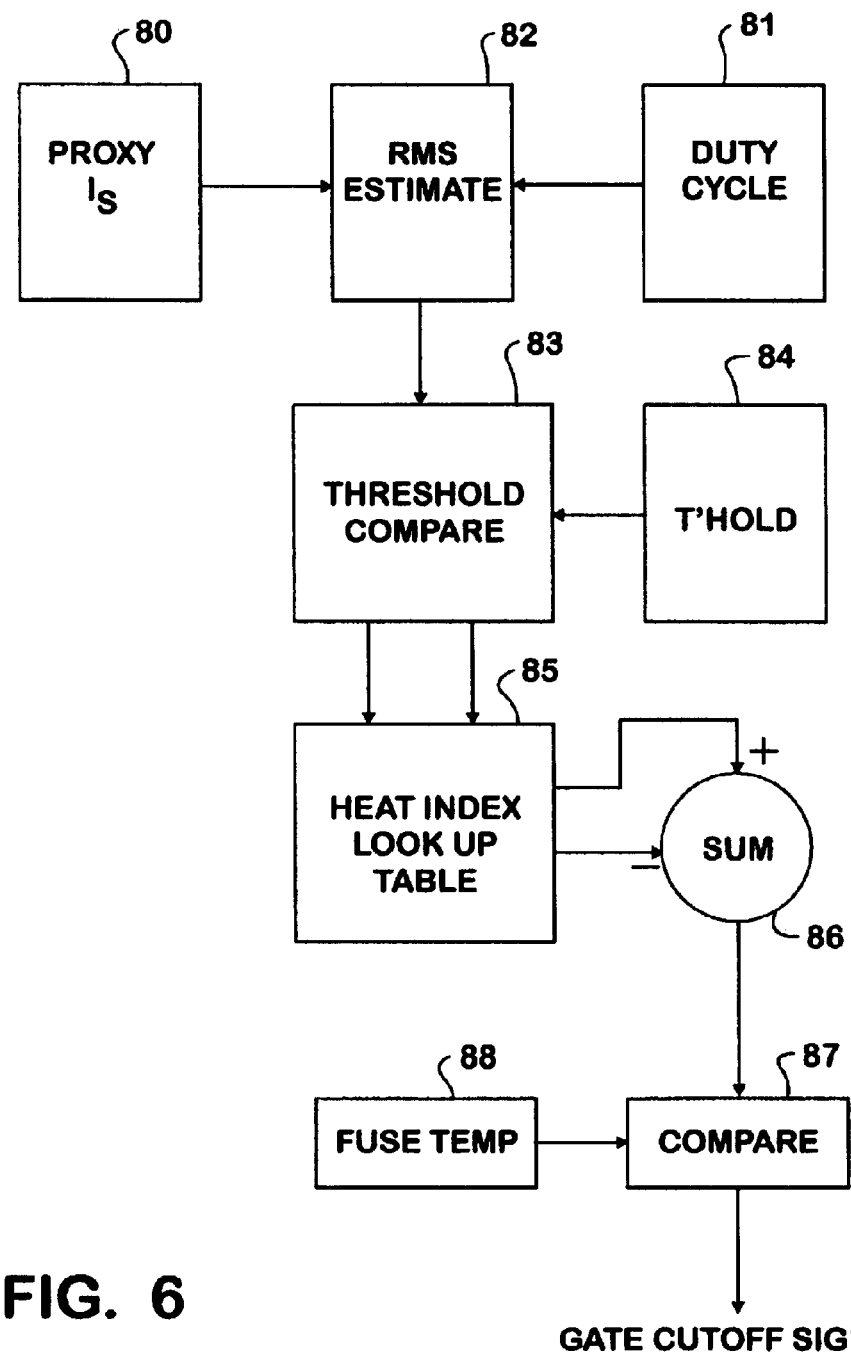
FIG. 6 is a flow chart of an algorithm used to implement the invention on a microprocessor.

FIG. 6 is a flow chart of the control routine executed by microprocessor 61 of ESC 24. A proxy for $I_S$, the digitally converted signal developed from the voltage level generated for $I_S$, is sampled at times indicated by the duty cycle when a pulse will have closed power FET 70. A set of consecutive samples will than be averaged and multiplied by the percentage of time that the duty cycle indicates that the FET 70 is conducting by an RMS estimate routine 82. The RMS estimate generated is passed to a direct current equivalent compare step 83, which compares this result with 110% of the desired rated value for a fuse for the lamp illumination circuit of FIG. 5. If the RMS current estimate exceeds the threshold the value is used as an input to a heat index function 85. Heat index function 85 may be an empirically developed look up table indexed by RMS current estimates or it may be an equation using the RMS estimates as an input variable. A result is obtained which is passed to a summer 86 which accumulates the results from prior executions of the step. When the threshold compare step indicates that the RMS estimate is less than the minimum threshold the heat index function 85 generates a number to be subtracted from the accumulated heat index result. With each cycle of sampling, the output of summer 86 is subjected to a compare operation at compare step 87 to a fuse temperature threshold 88. When the accumulated result exceeds this second threshold a gate cutoff signal is generated. The routine is repeated for successive collections of samples with the accumulated heat index result carried over from sample set to sample set.

The present invention allows vehicle manufactures to dispense with fuses for many circuits and to substantially reduce the size of the fuse block. A single type of power MOSFET may be used for to implement switching and protective functions for various circuits, simplifying assembly. The use of programmable components allows easy reconfiguration of vehicles. The invention is also usable with signals having substantial A.C. components.

While the invention is shown in only one of its forms, it is not thus limited but is susceptible to various changes and modifications without departing from the spirit and scope of the invention.

What is claimed is:

1. An electrical power distribution system, comprising:
   a solid state switch element having a control input and a load line for supplying current to a load, the solid state switch having a sense output for sourcing a sense current which is fractionally proportional to the load current;
   a switching controller having a control output connected to the control input of the solid state switch element and a sense input connected to the sense output of the solid state switch element;
   data processing means associated with the switching controller for storing and executing a direct current equivalent estimation routine, a load current threshold value, a heat index routine and a accumulated heat index threshold value; and
   the data processing means using the sense current as an input for developing a direct current equivalent estimate of the load current, for further comparing the direct current equivalent estimate to the load current threshold value, for executing the heat index subroutine using the load current root mean square estimation as an input, responsive to the direct current equivalent estimate exceeding the load current threshold value for accumulating the results of execution of the heat index routine and further responsive to the direct current equivalent estimate falling below load current threshold value, for applying a decay factor to the accumulated results.

2. An electrical power distribution system as claimed in claim 1, the data processing means further storing and executing a solid state switch duty cycle routine for generating a second input to the direct current equivalent estimation routine.

3. An electrical power distribution system as claimed in claim 2, the data processing means further storing and executing an ignition cycle routine for controlling the number of fuse events allowed to occur for a solid state switch per ignition cycle.

4. A power controller comprising:
   a power MOSFET having a drain for connection to a power supply, a source for connection to a load, a gate, and a load sense signal output;
   data processing means connected to the gate for applying a gate control signal and coupled to the load sense signal output for receiving the load sense signal output; and
   the data processing means providing for storing and executing programs including a duty control program for determining the normal conductive state of the MOSFET, a load current estimation program using the output of the duty control program and the load sense signal for inputs, an threshold program using the output of the load current estimation program as an input, and a heat index program using the results from the current estimation program and the threshold program as inputs for generating a gate control override signal for application to the gate for breaking conductivity through the MOSFET.

5. A power controller as claimed in claim 4, the current estimation program further comprising means for generating a root mean estimation of load current from sampled values of the load sense signal and a duty cycle for the gate from the duty control program.

6. A power controller as claimed in claim 5, the heat index program including a model of fuse behavior in which a heat index is incremented toward melting of a hypothetical fuse when the root mean estimation of load current exceeds a minimum threshold current and in which the heat index is subject to a decay function during periods then the root mean estimation is below the minimum threshold current.

7. A power controller as claimed in claim 6, wherein the heat index program is a function of difference between the root mean estimation and the minimum threshold current.

8. A power controller as claimed in claim 7, wherein the difference between the root mean estimation and the minimum threshold current is determined by the threshold program.

9. A power controller as claimed in claim 8, and further comprising an analog to digital converter connected to receive the load sense signal output.

10. A power controller as claimed in claim 9, wherein the data processing means includes a vehicle control network, a remote central electrical system controller and a MOSFET drive circuit located locally to the MOSFET.

11. A motor vehicle comprising:
    a plurality of electrical circuits;
    a switching element in each of the plurality of electrical circuits controlling energization thereof;
    means for indicating the current drawn by each of the plurality of electrical circuits;
    means for controlling the switch state of the switching elements in accord with a duty cycle for each of the switching elements; and
    circuit protective means taking as inputs the indication of current drawn by a particular electrical circuit and the duty cycle for the switch controlling energization of the particular electrical circuit and for determining therefrom a estimation of time to melting of a hypothetical fuse as a signal for opening the switching element.

12. A motor vehicle as claimed in claim 11, the switching element being a power MOSFET and the means for indicating current drawing including a output current sense signal generated by the MOSFET.

13. A motor vehicle as claimed in claim 12, the means for controlling the switching state of switching elements further comprising a microprocessor programmed to execute a duty cycle routine.

14. A motor vehicle as claimed in claim 13, the circuit protective means including a switching element control program for execution by the microprocessor, the program including a root mean estimation generation routine taking the output current sense signal and the output of the duty cycle routine as inputs, a threshold routine for determining whether the root mean estimation exceeds a current threshold, and a heat index routine taking the result of the threshold routine as an input and incrementing a heat index when the root mean estimation exceeds the current threshold and decrementing the heat index when the root mean estimation is less than the current threshold and for opening the switching element when the accumulated heat index exceeds a heat threshold.

15. A motor vehicle as claimed in claim 14, further comprising a motor vehicle network, where the microprocessor is part of an electrical system controller.

* * * * *